United States Patent
Rivlin

(10) Patent No.: US 10,931,454 B1
(45) Date of Patent: Feb. 23, 2021

(54) DECENTRALIZED MANAGEMENT OF DATA ACCESS AND VERIFICATION USING DATA MANAGEMENT HUB

(71) Applicant: CyberArk Software Ltd., Petach-Tikva (IL)

(72) Inventor: Ofer Rivlin, Petach-Tikva (IL)

(73) Assignee: CYBERARK SOFTWARE LTD., Petach-Tikva (IL)

( * ) Notice: Subject to any disclaimer, the term of this patent is extended or adjusted under 35 U.S.C. 154(b) by 0 days.

(21) Appl. No.: 17/016,727

(22) Filed: Sep. 10, 2020

(51) Int. Cl.
| | | |
|---|---|---|
| *H04L 29/06* | (2006.01) | |
| *H04L 9/32* | (2006.01) | |
| *G06F 21/60* | (2013.01) | |
| *H04L 9/08* | (2006.01) | |
| *G06F 16/27* | (2019.01) | |
| *G06F 16/245* | (2019.01) | |

(52) U.S. Cl.
CPC .......... *H04L 9/3213* (2013.01); *G06F 16/245* (2019.01); *G06F 16/27* (2019.01); *G06F 21/602* (2013.01); *H04L 9/0861* (2013.01); *H04L 9/3271* (2013.01)

(58) Field of Classification Search
CPC ... H04L 9/3213; H04L 9/0861; H04L 9/3271; G06F 16/27; G06F 16/245; G06F 21/602
See application file for complete search history.

(56) References Cited

U.S. PATENT DOCUMENTS

| | | |
|---|---|---|
| 9,118,631 B1 | 8/2015 | Yung et al. |
| 9,256,762 B1 | 2/2016 | Roth et al. |
| 2006/0101285 A1 | 5/2006 | Chen et al. |
| 2011/0317837 A1* | 12/2011 | Smith .................. H04L 9/0656 380/259 |
| 2012/0102039 A1 | 4/2012 | Gifford et al. |
| 2014/0026196 A1 | 1/2014 | Hayat |
| 2015/0365385 A1 | 12/2015 | Hore |
| 2016/0094521 A1 | 3/2016 | Rao et al. |
| 2016/0285625 A1 | 9/2016 | Roth et al. |
| 2016/0292451 A1 | 10/2016 | Diep et al. |

(Continued)

OTHER PUBLICATIONS

Scott Arciszewski, "How to Search on Securely Encrypted Database Fields", Retrieved From https://www.sitepoint.com/ how-to-search-on-securely-encrypted-database-fields/, Published Jun. 1, 2017 (Year: 2017).

(Continued)

*Primary Examiner* — Tri M Tran
(74) *Attorney, Agent, or Firm* — Finnegan, Henderson, Farabow, Garrett & Dunner, LLP

(57) ABSTRACT

Disclosed embodiments relate to securely facilitating decentralized management of identity data. Operations may include identifying a prompt to perform an attestation process for an identity; receiving, from the identity, a first request including: an index associated with encrypted data, a second part of a first cryptographic key, and a challenge token; generating a challenge response based on the challenge token; sending a second request to a data management hub including: the index and the challenge response; receiving a response to the second request, from the data management hub, the response including: doubly encrypted data formed by encrypting a copy of the encrypted data and a first part of the first cryptographic key; and decrypting the doubly encrypted data.

18 Claims, 5 Drawing Sheets

(56) References Cited

U.S. PATENT DOCUMENTS

2016/0299924 A1    10/2016   Fujimoto et al.
2017/0061151 A1    3/2017   Baessler et al.
2017/0078251 A1    3/2017   Grubbs
2018/0082076 A1    3/2018   Murray
2019/0102571 A1    4/2019   Wang et al.

OTHER PUBLICATIONS

Brearty et al., "The Performance Cost of Preserving Data/Query Privacy Using Searchable Symmetric Encryption", Retrieved From https://onlinelibrary.wiley.com/doi/full/10.1002/sec.1699, Published Nov. 10, 2016. (Year: 2016).

Nikitin etal., "Reducing Metadata Leakage from Encrypted Files and Communication with PURBs," Proceedings on Privacy Enhancing Technologies; Published 2019 (Year: 2019).

\* cited by examiner

DECENTRALIZED MANAGEMENT OF DATA ACCESS AND VERIFICATION USING DATA MANAGEMENT HUB

BACKGROUND

A credential is a document or data that can be used to attest to one's identity, qualification, competence, authority, and the like. Credentials such as driver's licenses, diplomas, certifications, premises-entry data, IoT-authorization data, and the like are commonly used. For example, a potential employer may request to see a diploma issued to an individual seeking employment. In response, the individual may present her diploma to the potential employer to attest to her qualification for the job.

Credentials can be issued digitally, and in some instances, credentials can be issued as verifiable credentials, meaning that their legitimacy can be cryptographically verified. Such credentials are the digital equivalent of their paper-based counterparts, and the owners of such credentials may use digital wallets to store their credentials.

A digital wallet may be implemented as an application installed on a mobile device, for example, and may be configured to securely store and transmit the owner's credentials and/or other identifying information (collectively referred to as identity data) to appropriate target devices or services when requested. For example, an individual may store identity data representing a digital equivalent of her diploma in a digital wallet. If a potential employer requests to view the individual's diploma, the individual may use the digital wallet to transmit the stored identity data to a device accessible to the potential employer.

However, while the digital wallet may be able to securely store and transmit the owner's identity data, the owner may still risk losing the identity data when the digital wallet is lost or stolen.

A data management hub, such as the Identity Hub™ developed by U2U Consult NV/SA, may help address the issue of lost or stolen digital wallets by storing the user's identity data in a decentralized manner on a cloud-based storage resource. However, because the identity data may contain sensitive information or personal identifiable information about the user, including, e.g., the user's name, birthplace, birthdate, biometric information (e.g., picture or fingerprint), and the like, storing the identity data on the cloud-based storage resource may leave a large number of users vulnerable if the data management hub is compromised and identity data is stolen.

Furthermore, users typically do not have control over the security measures taken by the data management hub. Users typically entrust the storage of sensitive information (e.g., personal data, financial data, medical data, etc.) and credentials to the data management hub without knowing the vulnerabilities of the data management hub.

There are thus needs for technological solutions to store and manage users' identity data without exposing the identity data to the data management hub. This would be advantageous in preventing malicious actors from obtaining users' identity data by attacking the data management hub. Furthermore, the extent of a breach of the data management hub would be mitigated, as the attacker would not be able to obtain the credentials and other sensitive data associated with the users of the data management hub. Further technical improvements are described in the example embodiments below.

SUMMARY

The embodiments described below relate to securely facilitating decentralized management of identity data. For example, in an example embodiment there may be a non-transitory computer readable medium including instructions that, when executed by at least one processor, cause the at least one processor to perform operations for securely facilitating decentralized management of identity data. The operations may comprise receiving, from an identity, encrypted data and an index associated with the encrypted data; receiving, from the identity, a first request comprising: the index, a first part of a first cryptographic key, and a target service cryptographic key; identifying, using the index, the encrypted data; encrypting a copy of the encrypted data using the target service cryptographic key to form a doubly encrypted data; sending a challenge token to the identity; receiving a second request, from a target service, the second request including: the index and a challenge response created based on the challenge token; and sending to the target service the doubly encrypted data and the first part of the first cryptographic key; wherein the target service is operable to decrypt the doubly encrypted data.

According to some embodiments, the encrypted data was encrypted using the first cryptographic key.

According to some embodiments, the first cryptographic key has been split into two parts, comprising the first part of the first cryptographic key and a second part of the first cryptographic key.

According to some embodiments, the second part of the first cryptographic key has been made available to the target service, and the target service is operable to recreate the first cryptographic key based on the first part of the first cryptographic key and the second part of the first cryptographic key.

According to some embodiments, the target service is operable to decrypt the doubly encrypted data using the recreated first cryptographic key and a second cryptographic key.

According to some embodiments, the target service cryptographic key is a public cryptographic key and the second cryptographic key is a private cryptographic key corresponding to the public cryptographic key.

According to some embodiments, the first cryptographic key is generated by an encryption service that is not controlled by the identity, and the first cryptographic key is unique to the encrypted data.

According to some embodiments, the challenge token is encrypted using the target service cryptographic key, and the target service is operable to decrypt the encrypted challenge token.

According to some embodiments, the target service is operable to validate a decrypted version of the encrypted data.

According to some embodiments, the target service is operable to permit the identity to access a service conditional on the validation.

Additional embodiments relate to a computer-implemented method for securely facilitating decentralized management of identity data. The method may comprise receiving, from an identity, encrypted data and an index associated with the encrypted data; receiving, from the identity, a first request comprising: the index, a first part of a first cryptographic key, and a target service cryptographic key; identifying, using the index, the encrypted data; encrypting a copy of the encrypted data using the target service cryptographic key to form a doubly encrypted data; sending a challenge token to the identity; receiving a second request, from a target service, the second request including: the index and a challenge response created based on the challenge token; and sending to the target service the doubly encrypted data and the first part of the first cryptographic key; wherein the target service is operable to decrypt the doubly encrypted data.

According to some embodiments, the encrypted data was encrypted using the first cryptographic key.

According to some embodiments, the first cryptographic key has been split into two parts, comprising the first part of the first cryptographic key and a second part of the first cryptographic key.

According to some embodiments, the second part of the first cryptographic key has been made available to the target service, and the target service is operable to recreate the first cryptographic key based on the first part of the first cryptographic key and the second part of the first cryptographic key.

According to some embodiments, the target service is operable to decrypt the doubly encrypted data using the recreated first cryptographic key and a second cryptographic key.

According to some embodiments, the target service cryptographic key is a public cryptographic key and the second cryptographic key is a private cryptographic key corresponding to the public cryptographic key.

According to some embodiments, the first cryptographic key is generated by an encryption service that is not controlled by the identity, and the first cryptographic key is unique to the encrypted data.

According to some embodiments, the challenge token is encrypted using the target service cryptographic key, and the target service is operable to decrypt the encrypted challenge token.

According to some embodiments, the target service is operable to validate a decrypted version of the encrypted data.

According to some embodiments, the target service is operable to permit the identity to access a service conditional on the validation.

Additional disclosed embodiments relate to securely facilitating decentralized management of identity data. For example, in an example embodiment there may be a non-transitory computer readable medium including instructions that, when executed by at least one processor, cause the at least one processor to perform operations for securely facilitating decentralized management of identity data. The operations may comprise identifying a prompt to perform an attestation process for an identity; receiving, from the identity, a first request comprising: an index associated with encrypted data, a second part of a first cryptographic key, and a challenge token; generating a challenge response based on the challenge token; sending a second request to a data management hub comprising: the index and the challenge response; receiving a response to the second request, from the data management hub, the response comprising: doubly encrypted data formed by encrypting a copy of the encrypted data and a first part of the first cryptographic key; and decrypting the doubly encrypted data.

According to some embodiments, the first part of the first cryptographic key has been encrypted together with the copy of the encrypted data in the doubly encrypted data.

According to some embodiments, the operations may further comprise performing a first decryption, on the doubly encrypted data, to yield the first part of the first cryptographic key and the copy of the encrypted data.

According to some embodiments, the operations may further comprise recreating the first cryptographic key based on the first part of the first cryptographic key and the second part of the first cryptographic key.

According to some embodiments, the operations may further comprise performing a second decryption, on the copy of the encrypted data using the recreated first cryptographic key, to yield a decrypted version of the encrypted data.

According to some embodiments, the operations may further comprise validating a decrypted version of the encrypted data by querying a distributed ledger service.

According to some embodiments, the operations may further comprise granting access to a service by the identity upon validation of a decrypted version of the encrypted data.

According to some embodiments, the first cryptographic key was created uniquely based on a master key.

According to some embodiments, the first cryptographic key was created using a key derivation function based on the master key.

According to some embodiments, the prompt to perform the attestation process for the identity is a request by the identity.

Additional embodiments relate to securely facilitating decentralized management of identity data. For example, in some embodiments there may be a computer-implemented method for securely facilitating decentralized management of identity data, the method comprising: identifying a prompt to perform an attestation process for an identity; receiving, from the identity, a first request comprising: an index associated with encrypted data, a second part of a first cryptographic key, and a challenge token; generating a challenge response based on the challenge token; sending a second request to a data management hub comprising: the index and the challenge response; receiving a response to the second request, from the data management hub, the response comprising: doubly encrypted data formed by encrypting a copy of the encrypted data and a first part of the first cryptographic key; and decrypting the doubly encrypted data.

According to some embodiments, the first part of the first cryptographic key has been encrypted together with the copy of the encrypted data in the doubly encrypted data.

According to some embodiments, the method further comprising performing a first decryption, on the doubly encrypted data, to yield the first part of the first cryptographic key and the copy of the encrypted data.

According to some embodiments, the method further comprising recreating the first cryptographic key based on the first part of the first cryptographic key and the second part of the first cryptographic key.

According to some embodiments, the method further comprising performing a second decryption, on the copy of the encrypted data using the recreated first cryptographic key, to yield a decrypted version of the encrypted data.

According to some embodiments, the method further comprising validating a decrypted version of the encrypted data by querying a distributed ledger service.

According to some embodiments, the method further comprising granting access to a service by the identity upon validation of a decrypted version of the encrypted data.

According to some embodiments, the first cryptographic key was created uniquely based on a master key.

According to some embodiments, the first cryptographic key was created using a key derivation function based on the master key.

According to some embodiments, the prompt to perform the attestation process for the identity is a request by the identity.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
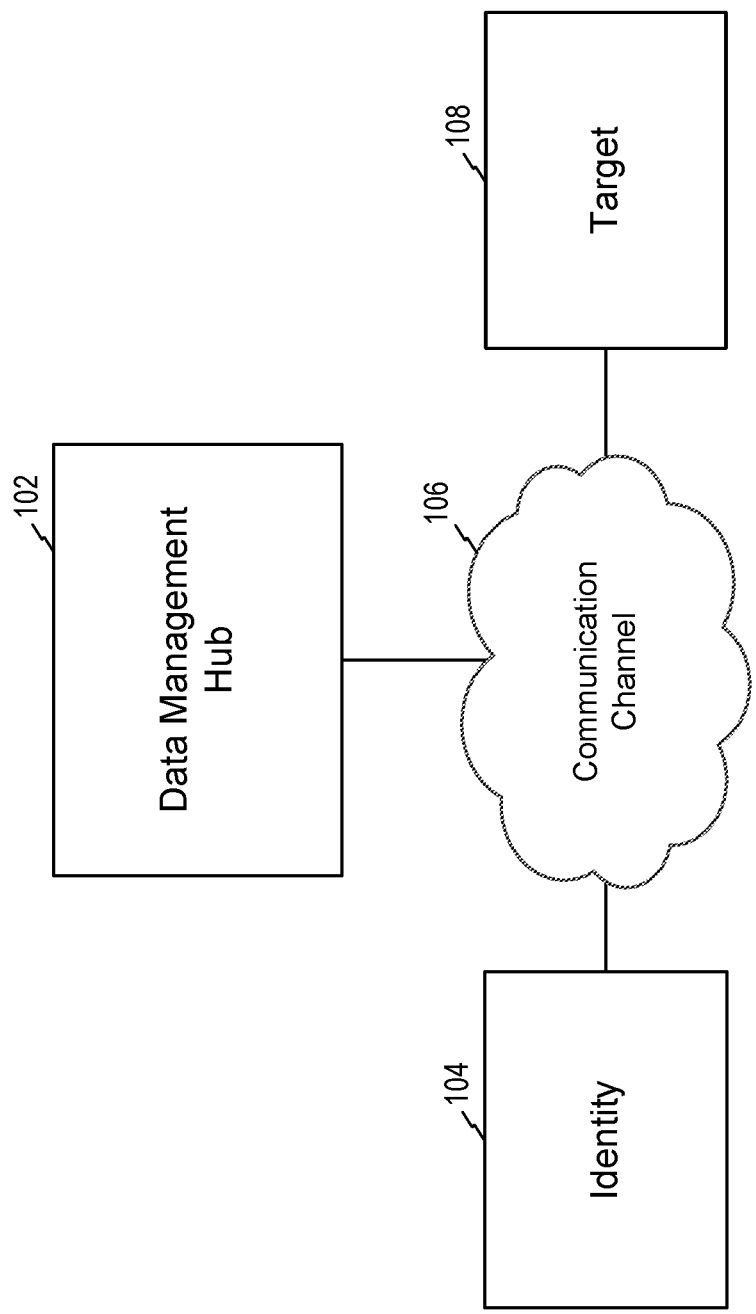
FIG. 1 is a block diagram of an exemplary system for securely facilitating decentralized management of identity data in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of securely facilitating decentralized management of identity data addressed herein overcome several important technical problems in the fields of identity security, data security, and communications security. Rather than relying on a data management hub to securely store users' credentials or other identity data, the techniques discussed below allow a user to provide encrypted identity data to the data management hub instead of its plaintext values. Users are able to utilize the data management hub to securely verify themselves to target devices or services without having to disclose the plaintext values of their identity data to the data management hub. The data management hub may therefore be completely blind as to what identity data is stored therein. In this manner, the potential for damages caused by a breach of the data management hub can be mitigated, as the attacker would not obtain the plaintext values of the credentials or other sensitive data associated with the users of the data management hub.

As described further below, identity data may refer to data unique to a user or an application. For example, with respect to a user, identity data may include credentials, personal identifiable information, login information, usernames, passwords, biometric data, DNA or a unique genetic sequence, biological data, unique personal characteristics, private data, and the like.

In some embodiments, an identity may be associated with a non-human user such as, for example, an organization, corporation, software application, computer hardware, computing device, artificial intelligence (AI) application, robotic device, and the like. For a non-human user, identity data may include, for example, credentials of the user (e.g., articles of incorporation, operating licenses, certifications, permits, etc.), login information, usernames, passwords, unique attributes or characteristics of the user, a tax identification number, serial number, unique metadata, universally unique identifier, cookie, timestamp, hash function, MAC address, domain or network name, and the like, as well as combinations of such data. In another example, a software application may be associated with application DNA or an application fingerprint based on, for example, factors including usage, users (both human and non-human), API calls, relationships and dependencies, stored files, runtime data, and the like. An application fingerprint may also identify an application or web-hosted resource by analyzing its framework, for example, by determining its architecture from information contained in an HTTP banner. Application DNA and/or an application fingerprint may uniquely identify an instance of an application such that it may operate as identity data.

Reference will now be made in detail to the disclosed embodiments, examples of which are illustrated in the accompanying drawings.

FIG. 1 is a block diagram of an example system 100 in accordance with disclosed embodiments. As shown, system 100 includes a data management hub 102, which may include one or more computing devices configured to provide data management solutions to one or more identities 104 (e.g., users, organizations, etc.). In some embodiments, data management hub 102 may operate as the Identity Hub™ developed by U2U Consult NV/SA or other types of identity and access management frameworks. In some embodiments, data management hub 102 may operate in a decentralized manner, and in some embodiments, data management hub 102 may be hosted in a cloud-based network (e.g., built on virtualized infrastructure from AWS™, Azure™, IBM Cloud™, VMWare™ or others.

An identity 104 may communicate with data management hub 102 through a computing device. The computing device may be a handheld device (e.g., a mobile phone, a tablet, or a notebook), a wearable device (e.g., a smart watch, smart jewelry, an implantable device, a fitness tracker, smart clothing, a head-mounted display, etc.), an IoT device (e.g., smart home device, industrial device, etc.), personal computer (e.g., a desktop or laptop), or various other devices capable of processing and/or receiving data. Exemplary components of the computing device are further discussed below in connection with FIG. 2.

The computing device may be in communication with data management hub 102 via a communication channel 106. Communication channel 106 may include a bus, a cable, a wireless communication channel, a radio-based communication channel, the Internet, a local area network (LAN), a wireless local area network (WLAN), a wide area network (WAN), a cellular communication network, or any Internet Protocol (IP), Secure Shell (SSH), Hypertext Transfer Protocol (HTTP), or Representational State Transfer (REST) based communication network and the like. In some embodiments, communication channel 106 may be based on public cloud infrastructure, private cloud infrastructure, hybrid public/private cloud infrastructure, or no cloud infrastructure. In such differing embodiments, data management hub 102 and identity 104 may each be in the same, or in different, networks or network segments. In some embodiments, identity 104 may be equipped with one or more compatible communication interfaces configured to support communications with data management hub 102 via communication channel 106. The communication interfaces are not shown in FIG. 1 for illustrative simplicity.

Identity 104 may utilize data management hub 102 to securely facilitate management of its identity data. For example, in some embodiments, identity 104 may utilize data management hub 102 to securely provide encrypted identity data to a target 108, which may communicate with data management hub 102 through another computing device. As will be described below, in some embodiments, identity 104 may utilize data management hub 102 to securely facilitate management of its identity data without disclosing the plaintext values of its identity data to data management hub 102. In such embodiments, a mechanism may be provided for target 108 to decrypt the encrypted identity data received from data management hub 102. In this manner, identity 104 can use data management hub 102 to securely share its identity data (e.g., credentials and the like) with target 108 while keeping data management hub 102 completely blind as to the plaintext values of its identity data.

Figure 2:
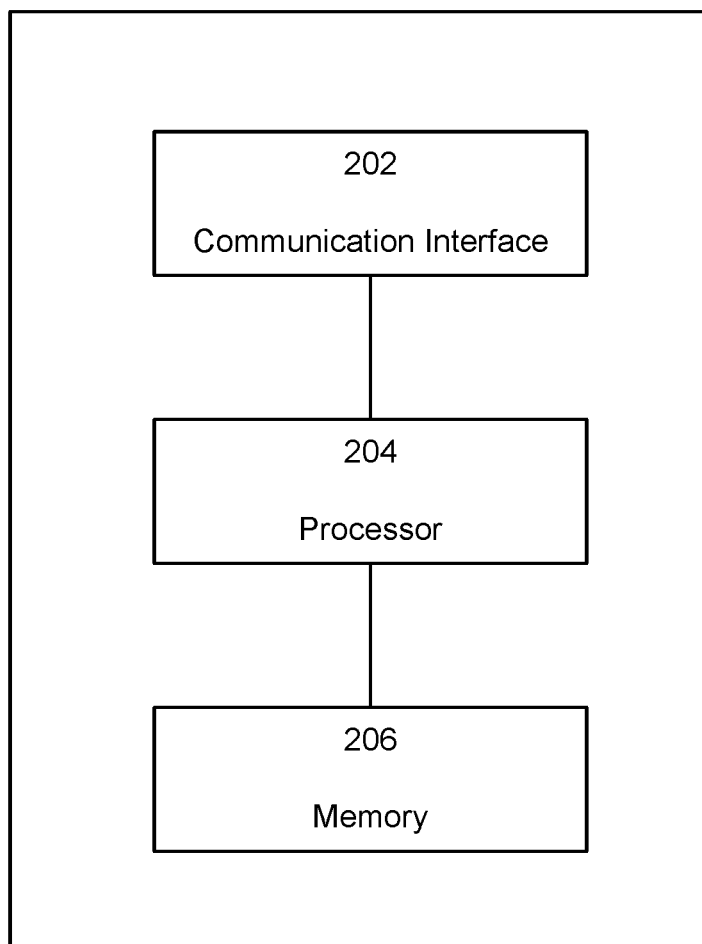
FIG. 2 is a block diagram of an example computing device in accordance with disclosed embodiments.

FIG. 2 illustrates a block diagram of an exemplary computing device 200 in accordance with disclosed embodiments. Referring to FIG. 2, computing device 200 may include a communication interface 202, a processor 204, and a memory 206, among potentially various other components.

The communication interface 202 may facilitate communications between computing device 200 and other computing devices or resources, including, e.g., computing devices utilized by data management hub 102, identity 104, and target 108 (shown in FIG. 1). In some embodiments, communication interface 202 may be configured to support one or more communication standards, such as an Internet standard or protocol, an Integrated Services Digital Network (ISDN) standard, and the like. In some embodiments, communication interface 202 may include one or more of a LAN card, a cable modem, a satellite modem, a data bus, a cable, a wireless communication channel, a radio-based communication channel, a cellular communication channel, an Internet Protocol, a SSH, a HTTP, or a REST based communication device, or other communication devices for wired and/or wireless communications. In some embodiments, communication interface 202 may be based on public cloud infrastructure, private cloud infrastructure, or hybrid public/private cloud infrastructure.

Processor 204 may include one or more dedicated processing units, application-specific integrated circuits (ASICs), field-programmable gate arrays (FPGAs), or various other types of processors or processing units. Processor 204 may be coupled with memory 206 and configured to execute instructions stored in memory 206.

Memory 206 may store processor-executable instructions and data. Memory 206 may include any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk. When the instructions in memory 206 are executed by processor 204, computing device 200 may perform operations for securely facilitating decentralized management of identity data, as discussed below in connection with FIGS. 3-5.

Figure 3:
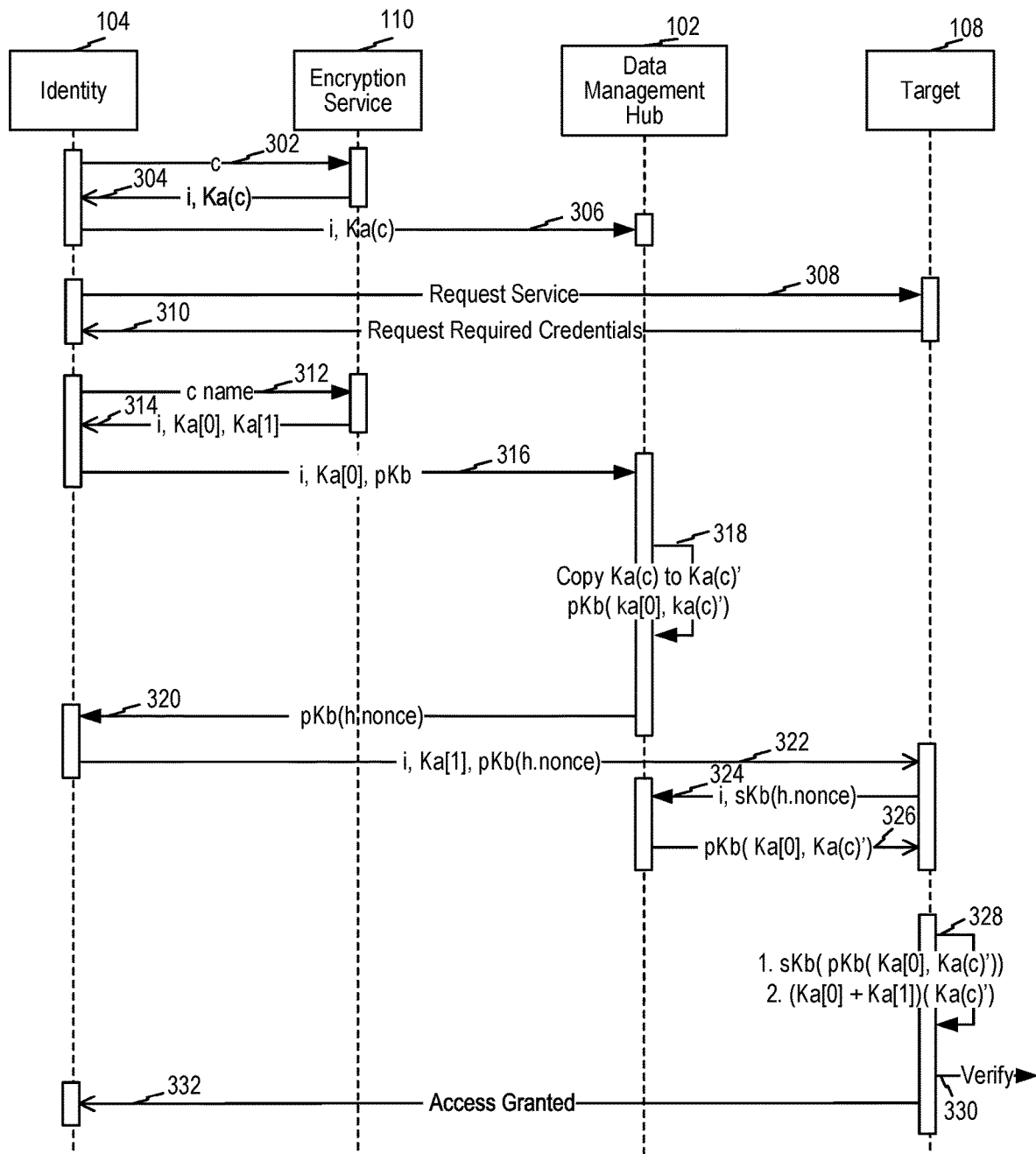
FIG. 3 is an exemplary system process flow showing operations for securely facilitating decentralized management of identity data in accordance with disclosed embodiments.

Referring now to FIG. 3, an exemplary flowchart showing a process 300 for securely facilitating decentralized management of identity data is shown. In accordance with above embodiments, process 300 may be implemented in system 100 as depicted in FIG. 1. For example, process 300 may be performed by one or more computing devices utilized by data management hub 102, identity 104, and target 108.

For illustrative purposes, a high-level use case is described in conjunction with the descriptions of the specific operations of process 300. Continuing with the example presented above, the high-level use case includes an identity 104 (e.g., an individual) who may use data management hub 102 to securely share a credential (e.g., an electronic attestation of her diploma) with a target 108 (e.g., a potential employer). More specifically, identity 104 may receive the credential from an issuer (e.g., the school she attended) and securely encrypt and store the encrypted credential on data management hub 102. If identity 104 later wants to share the credential with target 108, identity 104 may send a request to data management hub 102 to give access to the stored encrypted credential to target 108. Identity 104 may then send target 108 certain information that enables target 108 to retrieve the encrypted credential from data management hub 102. Target 108 may retrieve the encrypted credential from data management hub 102, decrypt the credential, and cryptographically verify the legitimacy of the decrypted credential. These exemplary operations are described in further detail below.

To implement the use case depicted above, at step 302, identity 104 may send the credential c received from the issuer (not shown) to an encryption service 110 for encryption. In some embodiments, identity 104 may send the credential c from a digital wallet used by identity 104. However, identity 104 is not required to store the credential c in a digital wallet. Therefore, in some embodiments, identity 104 may use any computing device accessible to identity 104 to send the credential c to encryption service 110.

In some embodiments, encryption service 110 may be implemented as a stand-alone or a third-party service accessible to identity 104. In some embodiments, encryption service 110 may be a service implemented locally on one or more computing devices utilized by identity 104. In some embodiments, encryption service 110 may be implemented in accordance with one or more encryption services disclosed in U.S. patent application Ser. No. 16/853,267, entitled "Client Microservice for Secure and Efficient Searchable Encryption," which is herein incorporated by reference in its entirety. Such encryption services 110 may be utilized to encrypt data for storage in a database that can facilitate searching of the encrypted data without needing to decrypt the encrypted data or otherwise compromise the integrity of the encryption.

At step 304, encryption service 110 may encrypt the credential c using a unique cryptographic key $K_a$ generated for the credential c. For illustrative purposes, the encrypted data (i.e., data representing the credential c encrypted using the cryptographic key $K_a$) may be denoted as $K_a(c)$. Encryption service 110 may also generate a unique index i associated with the encrypted data $K_a(c)$ and send the index i and the encrypted data $K_a(c)$ to identity 104.

In some embodiments, the cryptographic key $K_a$ may be generated specifically for the credential c using a cryptography key derivation function, which may be cryptographic hash function that derives one or more secret keys from a secret value such as a master key, a password, or a passphrase using a pseudorandom function. It is contemplated that other key generation techniques may be utilized to generate the cryptographic key $K_a$ without departing from the spirit and scope of the present disclosure.

At step 306, identity 104 may send the index i and the encrypted data $K_a(c)$ to data management hub 102 for storage. In this manner, identity 104 can securely encrypt and store the encrypted data $K_a(c)$ on data management hub 102 without disclosing the plaintext value of the credential c to data management hub 102.

At step 308, identity 104 may send a service request to target 108. Continuing with the example above, the service request may include a job application request (e.g., identity 104 requesting target 108 to consider identity 104 for a job). Alternatively, the request may include various other types of requests, including, e.g., access requests, login requests, authentication requests, instructions to perform certain tasks, permission to perform certain tasks, etc. It is to be understood that the types of services requested by identity 104 described above are merely exemplary and are not meant to be limiting. It is contemplated that identity 104 may request other types of services without departing from the spirit and scope of the present disclosure.

At step 310, target 108 may send a credential request to identity 104 in response to receiving the service request. The credential request may specific one or more credentials identity 104 needs to provide in order for target 108 to grant the service requested by identity 104. For example, if the service request includes a job application request, the credential request may require identity 104 to share her diploma with target 108. In another example, if the service request includes a login request, the credential request may require identity 104 to provide a proper username and a valid password to target 108. In still another example, if the service request includes a command to perform certain operations, the credential request may require identity 104 to prove that identity 104 has proper authority or permission to send such command to target 108. It is to be understood that the types of credentials requested by target 108 described above are merely exemplary and are not meant to be limiting. It is contemplated that target 108 may request other types of credentials without departing from the spirit and scope of the present disclosure.

Continuing with the example above, target 108 may request identity 104 to provide credential c (e.g., an electronic attestation of her diploma), for which identity 104 has already stored the corresponding encrypted data $K_a(c)$ in data management hub 102 (at step 306). In response, identity 104 may prepare to send target 108 certain information that will allow target 108 to retrieve the encrypted data $K_a(c)$ from data management hub 102. In some embodiments, steps 312-320 may be carried out to prepare the information to be provided to target 108 to facilitate secure retrieval of the encrypted data $K_a(c)$.

At step 312, identity 104 may send the credential c or a piece of data that can be used to identify the credential c (e.g., the name of the credential c) to encryption service 110.

At step 314, encryption service 110 may regenerate the cryptographic key $K_a$ for the credential c using the same key generation technique used to generate the cryptographic key $K_a$ at step 304. In some embodiments, encryption service 110 may split the regenerated cryptographic key $K_a$ into two parts using a secret sharing process, which may be implemented based on various types of methods available for distributing a secret amongst a group of participants, each of whom is allocated a share of the secret. For example, secret sharing techniques such as Shamir's scheme or Blakley's scheme may be utilized. In some embodiments, the cryptographic key $K_a$ may be split into a first part of the cryptographic key $K_a[0]$ and a second part of the cryptographic key $K_a[1]$. In some embodiments, the cryptographic key $K_a$ may be reconstructed (or recreated) based on the first part of the cryptographic key $K_a[0]$ and the second part of the cryptographic key $K_a[1]$. In some embodiments, merely having possession of either the first part of the cryptographic key $K_a[0]$ or the second part of the cryptographic key $K_a[1]$ alone may be insufficient to recreate the cryptographic key $K_a$.

Also at step 314, encryption service 110 may send the first part of the cryptographic key $K_a[0]$ and a second part of the cryptographic key $K_a[1]$ to identity 104. In some embodiments, encryption service 110 may also send the index i associated with the encrypted data $K_a(c)$ to identity 104. Alternatively, in some embodiments, identity 104 may be able to keep track of the index i received from encryption service 110 at step 304, in which case it may not be necessary for encryption service 110 to send the index i to identity 104 again at step 314. Furthermore, in some embodiments, some or all of the functions carried out at step 314 may be carried out at step 304.

At step 316, identity 104 may send a token request to data management hub 102 to request the generation of a challenge token. As will be described below, the challenge token can be used by identity 104 to enable secure sharing of the encrypted data $K_a(c)$ with target 108. In some embodiments, the token request sent by identity 104 may include the index i, the first part of the cryptographic key $K_a[0]$, and a target service cryptographic key pKb. In some embodiments, the target service cryptographic key pKb may be a public key used by target 108. And as will be described below, in some embodiments, the target service cryptographic key pKb may correspond to a private (i.e., secret) key sKb held by target 108.

At step 318, data management hub 102 may identify, using the index i, the encrypted data $K_a(c)$ stored in data management hub 102. Data management hub 102 may then copy $K_a(c)$ to create encrypted data $K_a(c)'$ and encrypt the encrypted data $K_a(c)'$ using the target service cryptographic key pKb to form a doubly encrypted data $pKb(K_a(c)'$. In some embodiments, data management hub 102 may copy $K_a(c)$ into a dedicated storage space (e.g., a requested credentials table or the like), and in some embodiments, data management hub 102 may associate the encrypted data $K_a(c)'$ with an identifier, which may be based on the index i and one or more attributes (e.g., the domain name or the like) of target 108. In some embodiments, data management hub 102 may automatically delete the encrypted data $K_a(c)'$ after a pre-configured period of time (e.g. 30 days). In some embodiments, data management hub 102 may also encrypt the first part of the cryptographic key $K_a[0]$ using the target service cryptographic key pKb to produce $pKb(K_a[0])$.

At step 320, data management hub 102 may generate and send a challenge token to identity 104. In some embodiments, data management hub 102 may generate the challenge token based on a one-time randomly generated nonce h.nonce, which may be encrypted using the target service cryptographic key pKb to form the challenge token pKb(h.nonce). As will be descried below, the challenge token pKb(h.nonce) may be used as a challenge for target 108, which may be required to solve the challenge before it is allowed to retrieve the encrypted data $K_a(c)'$ from data management hub 102.

At step 322, identity 104 may provide information to target 108 to facilitate secure retrieval of the encrypted data $K_a(c)'$. In some embodiments, identity 104 may send the index i, the second part of the cryptographic key $K_a[1]$, and the challenge token pKb(h.nonce) to target 108. In this manner, identity 104 can let target 108 retrieve the encrypted data $K_a(c)'$ stored in data management hub 102 directly from data management hub 102 without having to first download the encrypted data $K_a(c)$ or a copy of the encrypted data $K_a(c)'$ to identity 104 itself. Upon receiving the information from identity 104, target 108 may proceed to retrieve the encrypted data $K_a(c)'$ from data management hub 102.

At step 324, target 108 may send a retrieve request to data management hub 102. The retrieve request may include the index i and a challenge response created based on the challenge token pKb(h.nonce). In some embodiments, target 108 may create the challenge response by decrypting the challenge token pKb(h.nonce) using its secret key sKb to yield the none h.nonce. In some embodiments, target 108 may re-encrypt the nonce h.nonce with its secret key sKb to create a challenge response sKb(h.nonce). In this manner, target 108 can use the challenge response sKb(h.nonce) to prove its own identity to data management hub 102 (because otherwise target 108 would not be able to decrypt the challenge token pKb(h.nonce) and produce a proper challenge response sKb(h.nonce)).

At step 326, data management hub 102 may locate the doubly encrypted data $pKb(K_a(c)')$ (e.g., generated at step 318) using the index i (or using the index i and one or more attributes of target 108) and send the doubly encrypted data $pKb(K_a(c)')$ to target 108 along with the first part of the cryptographic key $K_a[0]$. As discussed above, in some embodiments, data management hub 102 may also encrypt the first part of the cryptographic key $K_a[0]$ using the target service cryptographic key pKb to produce $pKb(K_a[0])$. In such embodiments, data management hub 102 may send both the doubly encrypted data and the encrypted first part of the cryptographic key, i.e., $pKb(K_a(c)',K_a[0])$, to target 108.

At step 328, target 108 may decrypt the doubly encrypted data. In some embodiments, target 108 may decrypt the doubly encrypted data and the encrypted first part of the cryptographic key, i.e., $pKb(K_a(c)',K_a[0])$, using its secret key sKb to yield the encrypted data $K_a(c)'$ and the first part of the cryptographic key $K_a[0]$. Once target 108 obtains the first part of the cryptographic key $K_a[0]$, target 108 may use the first part of the cryptographic key $K_a[0]$ together with the second part of the cryptographic key $K_a[1]$ (received at step 320) to recreate the cryptographic key $K_a$. Subsequently, target 108 may utilize the cryptographic key $K_a$ to decrypt the encrypted data $K_a(c)'$ to yield a decrypted version (e.g., the plaintext value) of the credential c. In this manner, identity 104 can securely share its credential c with target 108 using data management hub 102 without having to disclose the plaintext value of the credential c to data management hub 102.

In some embodiments, target 108 may carry out additional steps, including, for example, validating the validity of the decrypted version of the encrypted data at step 330. In some embodiments, target 108 may perform step 330 using one or more computing devices accessible to target 108. In some embodiments, the validity of the decrypted version of the encrypted data (i.e., the credential c) may be cryptographically verified, for example, by verifying whether the credential c was digitally signed by an issuer who purportedly issued the credential c. In some embodiments, the validity of the decrypted version of the encrypted data (i.e., the credential c) may be verified by querying a distributed ledger service, including, e.g., a blockchain based distributed ledger service. In such embodiments, the issuance of the credential c (as well as any subsequent revocations and invalidations of the credential c) may be recorded on the distributed ledger service securely and immutably, and target 108 may query the distributed ledger service to determine whether the credential c subject to verification is indeed issued as purported and is still valid.

In some embodiments, if the credential c cannot be validated, target 108 may refuse to accept the credential c. In such embodiments, if identity 104 provided the credential c to demonstrate her qualification or authorization, target 108 may refuse to accept the qualification or authorization provided. If identity 104 provided the credential c to gain access to certain systems, target 108 may deny the access requested. On the other hand, if the credential c can be validated, target 108 may accept the credential c and/or grant the access requested at step 332.

It is to be understood that the use case described above is merely presented as an example and is not meant to be limiting. It is contemplated that other use cases may also benefit from utilizing process 300 to securely facilitate decentralized management of identity data. It is also to be understood that while the use case described above referenced an individual as identity 104 and a potential employer as target 108, such references are merely presented as examples and are not meant to be limiting. It is contemplated that identity 104 and target 108 may be associated with human users as well as non-human users, including, for example, organizations, corporations, software applications, computer hardware, computing devices, artificial intelligence (AI) applications, robotic devices, and the like.

Furthermore, it may be appreciated that by using process 300 to securely facilitate decentralized management of identity data, identity 104 no longer needs to expose its identity data (including, e.g., the credential c) to data management hub 102. In other words, data management hub 102 may be configured to not have access to the plaintext value of the credential c stored therein. In such embodiments, only target 108 may be granted access to obtain the plaintext value of the credential c, and the access granted to target 108 may be limited to only the credential c (because identity 104 only provided the index i associated with the encrypted data $K_a(c)$ to target 108). In this manner, even if identity 104 has another credential c' stored in data management hub 102, target 108 may still only be able to retrieve and decrypt $K_a(c)$ and not $K_a(c')$, unless identity 104 also provided the index i' associated with the other encrypted credential $K_a(c')$ to target 108.

Also, it may be appreciated that neither identity 104 nor target 108 needs to expose their private (or secret) keys to others to facilitate the data exchanges carried out using process 300. In addition, by using process 300 to securely facilitate decentralized management of identity data, identity 104 is not required to store any identity data in a digital wallet. In other words, by using process 300, identity 104 may be able to use any computing device to communicate with data management hub 102 and target 108. Thus, the need for digital wallet may be eliminated entirely. Furthermore, by using process 300, identity 104 and target 108 can communicate with data management hub 102 asynchronously. Therefore, identity 104 does not need to be online to approve the request by target 108 to retrieve its credentials.

Figure 4:
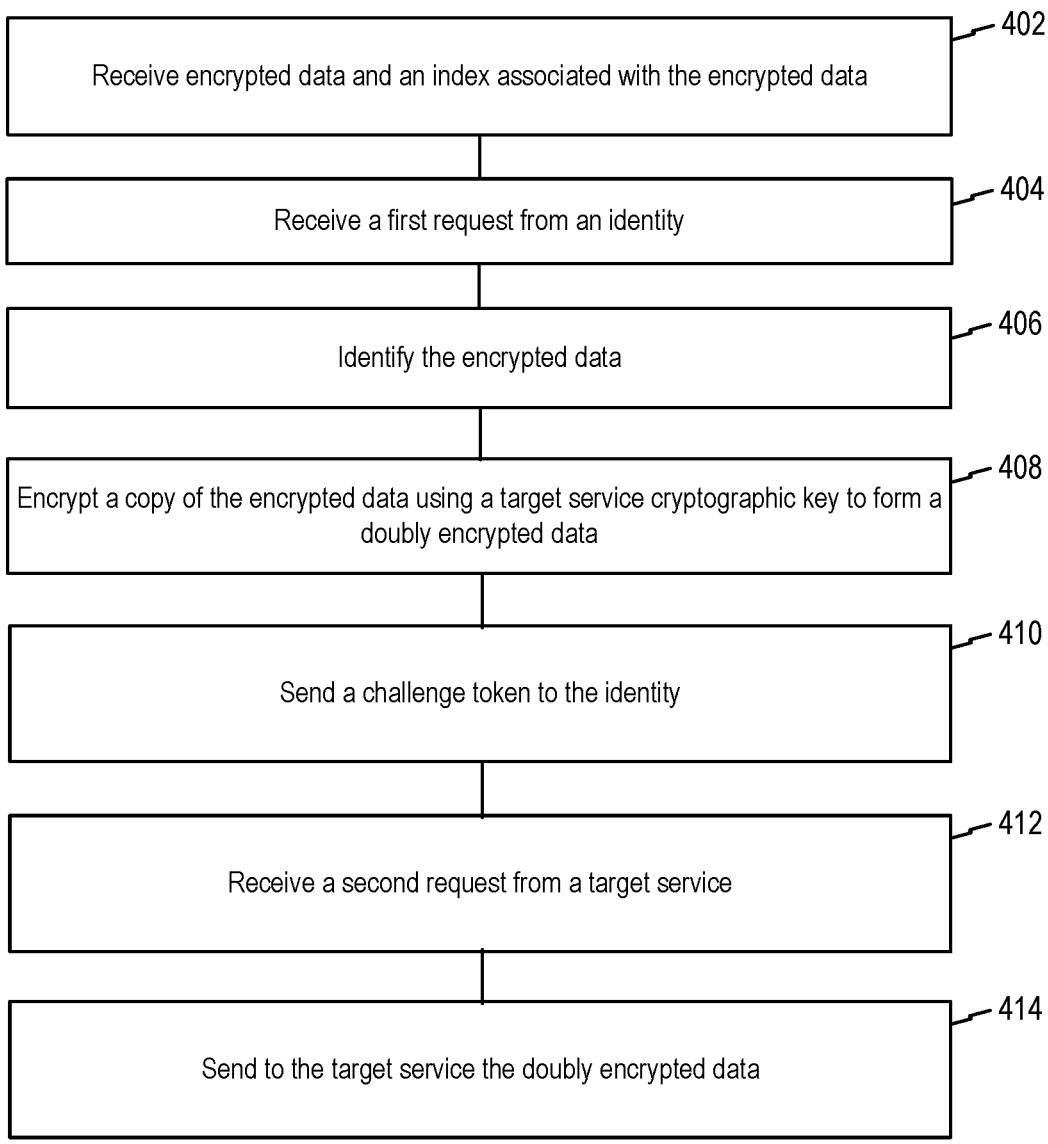
FIG. 4 is an exemplary system process flow showing operations for securely facilitating decentralized management of identity data in accordance with disclosed embodiments.

Referring now to FIG. 4, an exemplary flowchart showing a process 400 for securely facilitating decentralized management of identity data is shown. In accordance with above embodiments, process 400 may be implemented in system 100 depicted in FIG. 1. For example, process 400 may be performed by one or more computing devices of data management hub 102.

At step 402, process 400 may receive, from an identity (e.g., identity 104 shown in FIGS. 1 and 3), encrypted data and an index associated with the encrypted data. As described above, in some embodiments, the encrypted data may include data representing a credential c encrypted using a first cryptographic key $K_a$. In some embodiments, the first cryptographic key $K_a$ may be generated by an encryption service (e.g., a cryptography key derivation function) that is not controlled by the identity, and the first cryptographic key $K_a$ may be unique to the encrypted data. For illustrative purposes, the encrypted data may be denoted as $K_a(c)$. And as described above, the index associated with the encrypted data $K_a(c)$ may include an index i.

At step 404, process 400 may receive, from the identity, a first request. In some embodiments, the first request received at step 404 may include a token request described above at step 316. And as described above, in some embodiments, the first cryptographic key $K_a$ may be split into two parts, including a first part of the first cryptographic key $K_a[0]$ and a second part of the first cryptographic key $K_a[1]$. In such embodiments, the first request may include the index i, the first part of the first cryptographic key $K_a[0]$, and a target service cryptographic key pKb.

At step 406, process 400 may identify, using the index i, the encrypted data $K_a(c)$. At step 408, process 400 may copy the encrypted data $K_a(c)$ and encrypt a copy of the encrypted data $K_a(c)'$ using the target service cryptographic key pKb to form a doubly encrypted data $pKb(K_a(c)'$. In some embodiments, process 400 may also encrypt the first part of the first cryptographic key $K_a[0]$ using the target service cryptographic key pKb to produce $pKb(K_a[0])$.

At step 410, process 400 may send a challenge token to the identity. As described above, in some embodiments, process 400 may generate the challenge token based on a one-time randomly generated nonce h.nonce. In some embodiments, process 400 may encrypt the nonce h.nonce using the target service cryptographic key pKb to form the challenge token pKb(h.nonce). In this manner, a target service may be operable to decrypt the encrypted challenge token pKb(h.nonce) using a secret key sKb held by the target service that corresponds to the target service cryptographic key pKb.

At step 412, process 400 may receive a second request from the target service (e.g., target 108 shown in FIGS. 1 and 3). In some embodiments, the second request received at step 412 may include a retrieve request described above at step 324. And as described above, in some embodiments, the second request may include the index i and a challenge response created based on the challenge token pKb (h.nonce). In some embodiments, the target service may create the challenge response by decrypting the challenge token pKb(h.nonce) it received using its secret key sKb to yield the none h.nonce. In some embodiments, target 108 may re-encrypt the nonce h.nonce with its secret key sKb to create the challenge response sKb(h.nonce). In this manner, the target service may use the challenge response sKb (h.nonce) to prove its own identity to process 400. If the target service is not able to decrypt the challenge token pKb(h.nonce) and produce a proper challenge response sKb(h.nonce), process 400 may refuse to proceed further. On the other hand, if the target service is able to decrypt the challenge token pKb(h.nonce) and produce a proper challenge response sKb(h.nonce), process 400 may proceed.

At step 414, process 400 may send to the target service the doubly encrypted data $pKb(K_a(c)')$ and the first part of the first cryptographic key $K_a[0]$. In some embodiments, process 400 may also encrypt the first part of the first cryptographic key $K_a[0]$ using the target service cryptographic key pKb. In such embodiments, process 400 may send both the doubly encrypted data and the encrypted first part of the first cryptographic key, i.e., $pKb(K_a(c)',K_a[0])$, to the target service.

In some embodiments, the target service 108 may be operable to decrypt the doubly encrypted data as described above. For example, in some embodiments, the target service 108 may be operable to decrypt the doubly encrypted data and the encrypted first part of the cryptographic key, i.e., $pKb(K_a(c)',K_a[0])$, using a second cryptographic key to obtain the encrypted data $K_a(c)'$ and the first part of the first cryptographic key $K_a[0]$. In some embodiments, the second cryptographic key is the private (or secret) cryptographic key sKb held by the target service that corresponds to the target service cryptographic key pKb, which is a public cryptographic key.

In some embodiments, the second part of the first cryptographic key $K_a[1]$ may be made available to the target service 108 (e.g., as described above at step 322), and the target service 108 may be operable to recreate the first cryptographic key $K_a$ based on the first part of the first cryptographic key $K_a[0]$ and the second part of the first cryptographic key $K_a[1]$.

In some embodiments, the target service 108 may utilize the recreated first cryptographic key $K_a$ to decrypt the encrypted data $K_a(c)'$ and obtain a decrypted version (e.g., the credential c) of the encrypted data $K_a(c)'$. In other words, the target service 108 may be operable to decrypt the doubly encrypted data $pKb(K_a(c)')$ using the recreated first cryptographic key $K_a$ and the second cryptographic key sKb.

In some embodiments, the target service 108 may be operable to validate the decrypted version of the encrypted data. For example, the target service 108 may validate the decrypted version of the encrypted data using one or more computing devices accessible to the target service 108. In some embodiments, the validity of the decrypted version of the encrypted data may be cryptographically verified, for example, by verifying whether the underlying data was digitally signed by an issuer who purportedly issued the data. In some embodiments, the validity of the decrypted version of the encrypted data may be verified by querying a distributed ledger service, including, e.g., a blockchain based distributed ledger service.

In some embodiments, the target service 108 may be operable to permit the identity 104 to access a service conditional on the validation. For example, if the target service 108 cannot validate the decrypted version of the encrypted data, the target service 108 may refuse to allow the identity 104 to access the service. On the other hand, if the target service 108 can validate the decrypted version of the encrypted data, the target service 108 may permit the identity 104 to access the service.

Figure 5:
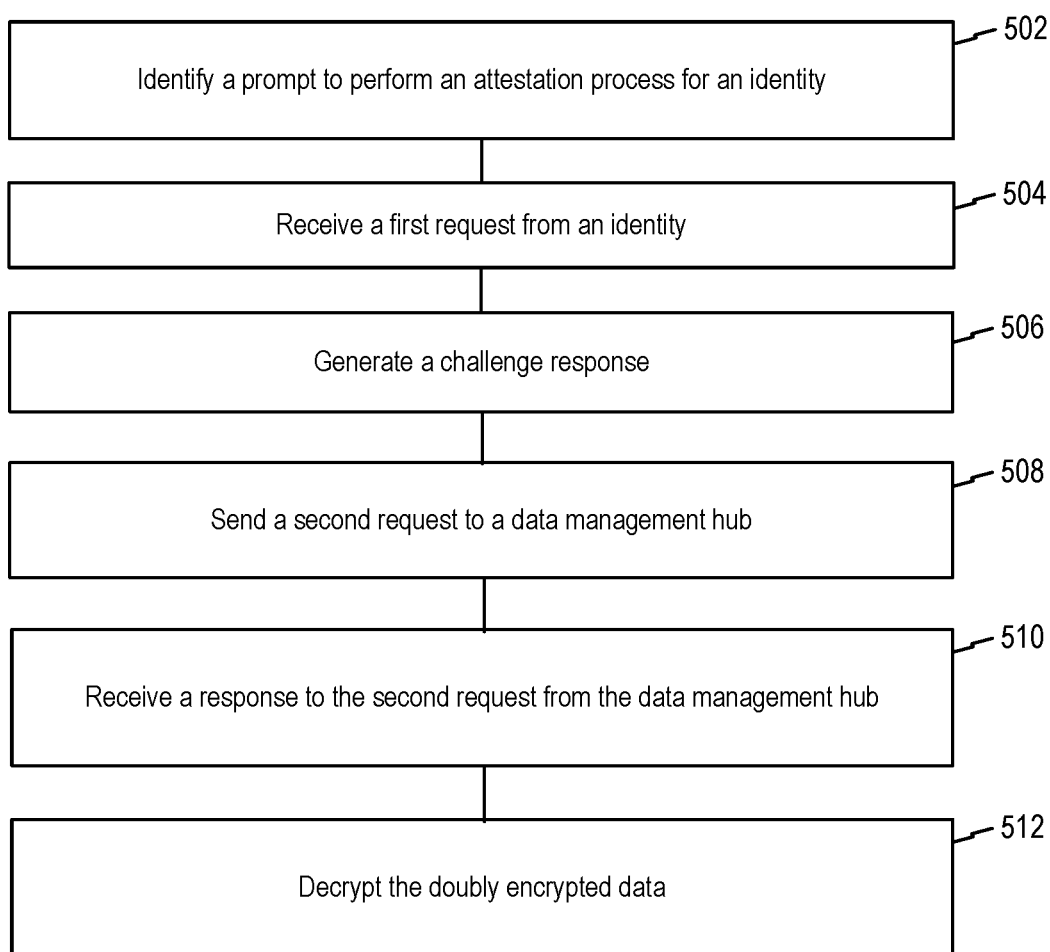
FIG. 5 is an exemplary flowchart showing a process for securely facilitating decentralized management of identity data in accordance with disclosed embodiments.

Referring now to FIG. 5, an exemplary flowchart showing a process 500 for securely facilitating decentralized management of identity data is shown. In accordance with above embodiments, process 500 may be implemented in system 100 depicted in FIG. 1. For example, process 500 may be performed by one or more computing devices of target 108.

At step 502, process 500 may identify a prompt to perform an attestation process for an identity (e.g., identity 104 shown in FIGS. 1 and 3). In some embodiments, the prompt to perform the attestation process for the identity may include a request by the identity. The request may include, for example, a request that may require the identity to show certain credentials, including, e.g., diplomas, usernames, passwords, as well as other types of credentials that can be utilized to attest to one's identity, qualification, competence, authority, permission, and the like. It is contemplated that the prompt may be identified and communicated in various manners without departing from the spirit and scope of the present disclosure.

At step 504, process 500 may receive, from the identity 104, a first request. In some embodiments, the first request may include an index associated with encrypted data. For illustrative purposes, the encrypted data may be denoted as $K_a(c)$, which may represent a credential c encrypted using a first cryptographic key $K_a$. In some embodiments, the first cryptographic key $K_a$ may be created using a cryptography key derivation function that derives one or more secret keys based on a master key. In such embodiments, the index may include a unique index i associated with the encrypted data $K_a(c)$.

In some embodiments, the first cryptographic key $K_a$ may be split into two parts, which may include a first part of the first cryptographic key $K_a[0]$ and a second part of the first cryptographic key $K_a[1]$. In such embodiments, the first request may include the second part of the first cryptographic key $K_a[1]$.

The first request may also include a challenge token. In some embodiments, the challenge token may be generated based on a one-time randomly generated nonce h.nonce. In some embodiments, the challenge token may be encrypted using a target service cryptographic key pKb to form the challenge token pKb(h.nonce). In some embodiments, the target service cryptographic key pKb may be a public key used by the target service 108 (e.g., a service provided by target 108 shown in FIGS. 1 and 3), which may also hold a private (i.e., secret) key sKb that corresponds to the target service cryptographic key pKb. In this manner, the target service 108 may be operable to decrypt the encrypted challenge token pKb(h.nonce) using the secret key sKb.

At step 506, process 500 may generate a challenge response based on the challenge token. In some embodiments, process 500 may generate the challenge response by decrypting the challenge token pKb(h.nonce) using its secret key sKb to yield the none h.nonce and re-encrypt the nonce h.nonce with its secret key sKb to generate the challenge response sKb(h.nonce).

At step 508, process 500 may send a second request to a data management hub to retrieve data from the data management hub (e.g., data management hub shown in FIGS. 1 and 3). In some embodiments, the second request may include the index i and the challenge response sKb(h.nonce).

At step 510, process 500 may receive a response to the second request from the data management hub 102. In some embodiments, the response may include doubly encrypted data formed by encrypting a copy of the encrypted data $K_a(c)'$ and the first part of the first cryptographic key $K_a[0]$. In some embodiments, the first part of the first cryptographic key $K_a[0]$ may be encrypted together with the encrypted data $K_a(c)'$ in the doubly encrypted data to form pKb($K_a(c)'$, $K_a[0]$).

At step 512, process 500 may decrypt the doubly encrypted data. In some embodiments, the encrypted data $K_a(c)'$ may be doubly encrypted using the target service cryptographic key pKb to form the doubly encrypted data pKb($K_a(c)'$. In such embodiments, process 500 may perform a first decryption on the doubly encrypted data pKb($K_a(c)'$) using its secret key sKb to yield the encrypted data $K_a(c)'$. In embodiments where the first part of the first cryptographic key $K_a[0]$ has been encrypted together with the encrypted data $K_a(c)'$, process 500 may perform the first decryption on pKb($K_a(c)'$,$K_a[0]$) using its secret key sKb to yield the encrypted data $K_a(c)'$ and the first part of the first cryptographic key $K_a[0]$.

In some embodiments, process 500 may recreate the first cryptographic key $K_a$ based on the first part of the first cryptographic key $K_a[0]$ and the second part of the first cryptographic key $K_a[1]$. Process 500 may then perform a second decryption on the encrypted data $K_a(c)'$ using the first cryptographic key $K_a$ to yield a decrypted version (e.g., the credential c) of the encrypted data $K_a(c)'$.

In some embodiments, process 500 may further validate the decrypted version of the encrypted data. For example, process 500 may validate the decrypted version of the encrypted data using one or more computing devices accessible to the target service. In some embodiments, the validity of the decrypted version of the encrypted data may be cryptographically verified, for example, by verifying whether the underlying data was digitally signed by an issuer who purportedly issued the data. In some embodiments, the validity of the decrypted version of the encrypted data may be verified by querying a distributed ledger service, including, e.g., a blockchain based distributed ledger service.

In some embodiments, process 500 may grant access to a service by the identity upon validation of the decrypted version of the encrypted data. For example, if process 500 cannot validate the decrypted version of the encrypted data, the target service 108 may refuse to allow the identity 104 to access the service. On the other hand, if the target service 108 can validate the decrypted version of the encrypted data, the target service 108 may permit the identity 104 to access the service.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of the these terms is intended to include all such new technologies a priori.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for securely facilitating decentralized management of identity data, the operations comprising:
  identifying a prompt to perform an attestation process for an identity;
  receiving, from the identity, a first request comprising: an index associated with encrypted data, a second part of a first cryptographic key, and a challenge token;
  generating a challenge response based on the challenge token;
  sending a second request to a data management hub comprising: the index and the challenge response;
  receiving a response to the second request, from the data management hub, the response comprising: doubly encrypted data formed by encrypting a copy of the encrypted data and a first part of the first cryptographic key; and
  decrypting the doubly encrypted data, wherein the decrypted data is verified by querying a distributed ledger service.

2. The non-transitory computer readable medium of claim 1, wherein the first part of the first cryptographic key has been encrypted together with the copy of the encrypted data in the doubly encrypted data.

3. The non-transitory computer readable medium of claim 2, further comprising performing a first decryption, on the doubly encrypted data, to yield the first part of the first cryptographic key and the copy of the encrypted data.

4. The non-transitory computer readable medium of claim 3, further comprising recreating the first cryptographic key based on the first part of the first cryptographic key and the second part of the first cryptographic key.

5. The non-transitory computer readable medium of claim 4, further comprising performing a second decryption, on the copy of the encrypted data using the recreated first cryptographic key, to yield a decrypted version of the encrypted data.

6. The non-transitory computer readable medium of claim 1, further comprising granting access to a service by the identity upon validation of a decrypted version of the encrypted data.

7. The non-transitory computer readable medium of claim 1, wherein the first cryptographic key was created uniquely based on a master key.

8. The non-transitory computer readable medium of claim 7, wherein the first cryptographic key was created using a key derivation function based on the master key.

9. The non-transitory computer readable medium of claim 1, wherein the prompt to perform the attestation process for the identity is a request by the identity.

10. A computer-implemented method for securely facilitating decentralized management of identity data, the method comprising:
  identifying a prompt to perform an attestation process for an identity;
  receiving, from the identity, a first request comprising: an index associated with encrypted data, a second part of a first cryptographic key, and a challenge token;
  generating a challenge response based on the challenge token;
  sending a second request to a data management hub comprising: the index and the challenge response;
  receiving a response to the second request, from the data management hub, the response comprising:
  doubly encrypted data formed by encrypting a copy of the encrypted data and a first part of the first cryptographic key; and
  decrypting the doubly encrypted data, wherein the decrypted data is verified by querying a distributed ledger service.

11. The computer-implemented method of claim 10, wherein the first part of the first cryptographic key has been encrypted together with the copy of the encrypted data in the doubly encrypted data.

12. The computer-implemented method of claim 11, further comprising performing a first decryption, on the doubly encrypted data, to yield the first part of the first cryptographic key and the copy of the encrypted data.

13. The computer-implemented method of claim 12, further comprising recreating the first cryptographic key based on the first part of the first cryptographic key and the second part of the first cryptographic key.

14. The computer-implemented method of claim 13, further comprising performing a second decryption, on the copy of the encrypted data using the recreated first cryptographic key, to yield a decrypted version of the encrypted data.

15. The computer-implemented method of claim 10, further comprising granting access to a service by the identity upon validation of a decrypted version of the encrypted data.

16. The computer-implemented method of claim 10, wherein the first cryptographic key was created uniquely based on a master key.

17. The computer-implemented method of claim 16, wherein the first cryptographic key was created using a key derivation function based on the master key.

18. The computer-implemented method of claim 10, wherein the prompt to perform the attestation process for the identity is a request by the identity.

* * * * *